United States Patent
Shamshoum et al.

(10) Patent No.: US 6,323,293 B1
(45) Date of Patent: *Nov. 27, 2001

(54) ELECTRON DONOR AND CATALYST SYSTEM FOR OLEFIN POLYMERIZATION

(75) Inventors: Edwar Shoukri Shamshoum, Hou; Christopher G. Bauch; Theodore Harris, both of Seabrook, all of TX (US); Sehyun Kim, Parkersburg, WV (US); David John Rauscher, Angleton, TX (US)

(73) Assignee: Fina Technology, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,498

(22) Filed: Feb. 21, 1997

Related U.S. Application Data

(63) Continuation-in-part of application No. 08/512,245, filed on Aug. 7, 1995, which is a continuation of application No. 08/233,671, filed on Apr. 26, 1994, now abandoned.

(51) Int. Cl.$^7$ ............................... C08F 4/44; C08F 4/642
(52) U.S. Cl. ..................... 526/125.3; 502/121; 502/127
(58) Field of Search ................... 526/125.3; 502/121, 502/127

(56) References Cited

U.S. PATENT DOCUMENTS

| | | | |
|---|---|---|---|
| 4,784,983 | 11/1988 | Mao et al. | 502/111 |
| 4,861,847 | 8/1989 | Mao et al. | 526/125 |
| 4,927,797 | 5/1990 | Ewen et al. | 502/127 |
| 5,066,738 | 11/1991 | Ewen et al. | 526/124 |
| 5,247,031 * | 9/1993 | Kioka et al. | 526/125.3 |

\* cited by examiner

*Primary Examiner*—David W. Wu
*Assistant Examiner*—R. Rabago
(74) *Attorney, Agent, or Firm*—Evan K. Butts

(57) ABSTRACT

Provided is a process of polymerization wherein the catalyst comprises:
A) a catalyst component consisting essentially of titanium, magnesium, halogen, a polycarboxylic ester, and an organic phosphorus compound;
B) electron donor described by the formula:

$$R_1\text{---}\underset{\underset{OR_3}{|}}{\overset{\overset{OR_2}{|}}{Si}}\text{---}R_4$$

wherein $R_1$ is alkyl or cycloakylgroup containing at least one secondary or tertiary carbon atom, $R_2$ and $R_3$ are each independently alkyl or aryl group, and $R_4$ is an alkyl group having a primary carbon bonded to the silicon atom; and
C) organic aluminum compound.

15 Claims, 2 Drawing Sheets

ELECTRON DONOR AND CATALYST SYSTEM FOR OLEFIN POLYMERIZATION

This application is a continuation-in-part of U.S. application Ser. No. 08/512,245, filed Aug. 7, 1995, which is a continuation of U.S. application Ser. No. 08/233,671, filed Apr. 26, 1994, now abandoned.

FIELD OF THE INVENTION

This invention relates to traditional Ziegler-Natta polymerization; particularly the use of sterically hindered electron donors and their catalyst systems. Such donor and its catalyst systems are notably useful in enhanced tacticity in homo-polymerization of olefins and in improved control of molecular weight, particularly hydrogen response, in homo- and co-polymerization of monomers comprising at least one Ziegler-Natta polymerizable bond. This system is particularly useful in olefin polymerization, notably propylene.

BACKGROUND OF THE INVENTION

Mao et al. describe in U.S. Pat. Nos. 4,784,983 and 4,861,847, respectively, a process for preparing a catalyst component and a process for producing olefinic polymers by use of the catalyst component and an organic aluminum compound.

Ewen describes, in U.S. Pat. Nos. 4,927,797 and 5,066,738 which are incorporated by reference, a catalyst system and a process for polymerization of olefins, respectively. Both use a catalyst component described as a Toho-type new generation titanium catalyst in combination with an electron donor.

SUMMARY OF THE INVENTION

Our invention provides, at least, catalyst system and means for molecular weight control of polymers derived from Ziegler-Natta polymerizable monomers as well as enhanced tacticity control, particularly as measured by xylene solubility, of polymers derived from Ziegler-Natta polymerizable monomers from which tacticity differentiated polymers, particularly of olefins, especially a-olefins, may be produced. Use of this system provides particularly beneficial results in production of polypropylene.

DETAILED DESCRIPTION

Figure 1:
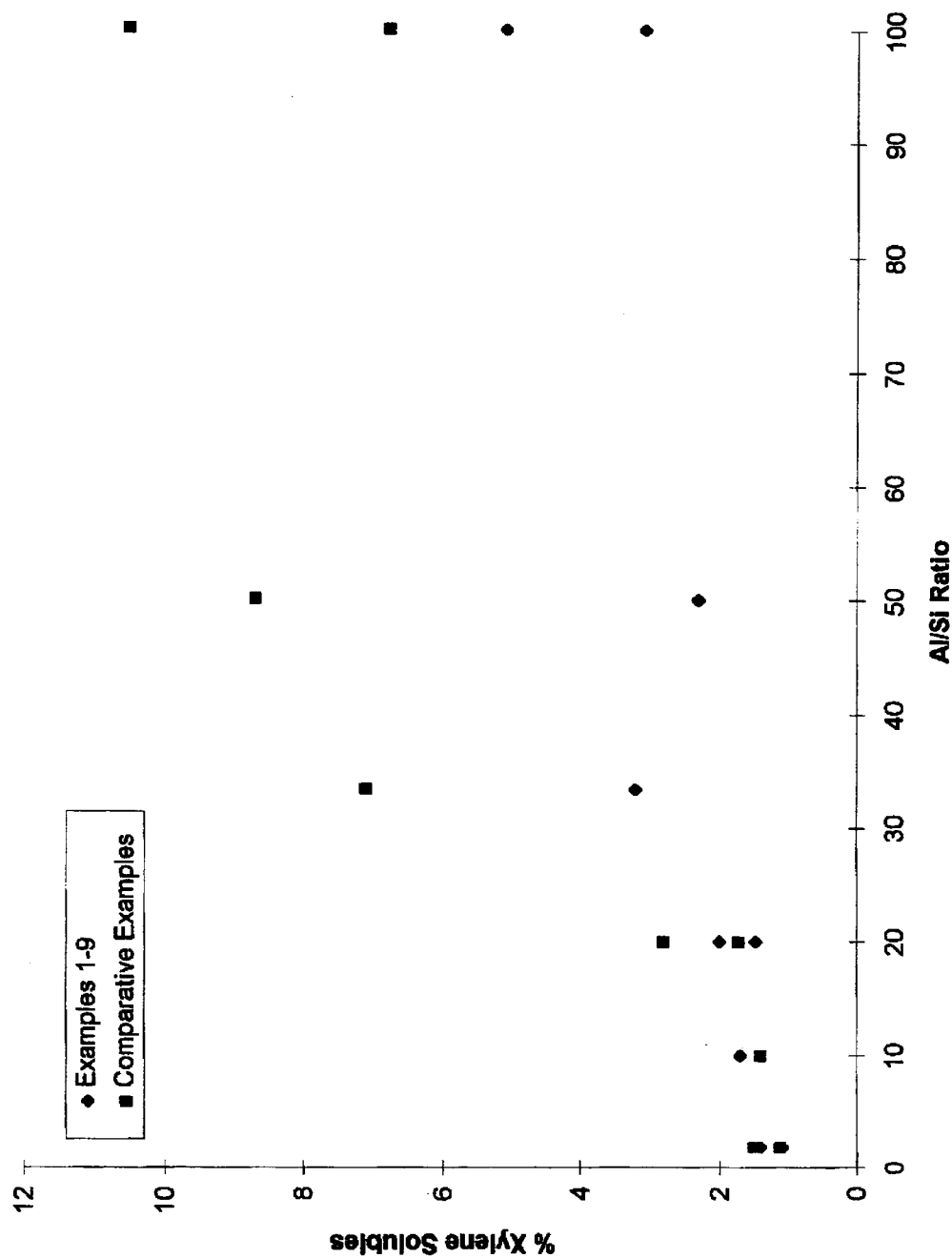
FIG. 1 graphically presents a comparison of xylene soluble content plotted against Al/Si ratio for inventive and comparative examples.
Figure 2:
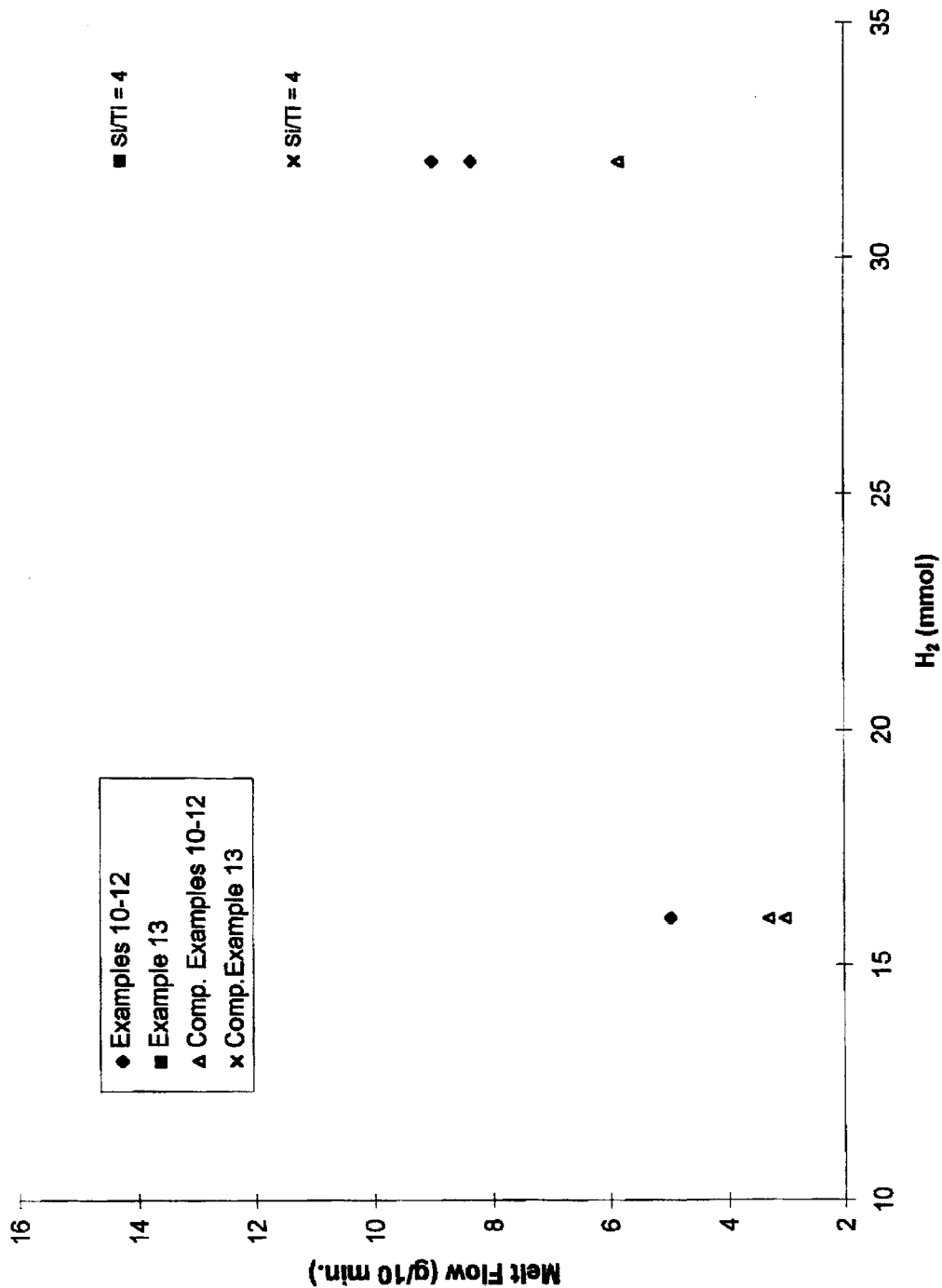
FIG. 2 graphically demonstrates that higher melt flow rates may be obtained using the inventive catalyst system than with prior art systems when similar amounts of chain transfer agent are used.

This invention provides embodiments of catalyst system and process for using catalyst system for polymerization of monomers having at least one Ziegler-Natta polymerizable bond.

One embodiment is process of homo-polymerizing monomers having at least one Ziegler-Natta polymerizable bond, such monomers being capable of producing polymer of differentiated tacticity, particularly propylene, comprising contacting monomers with, reacting monomers in presence of, or combinations thereof, catalyst system comprising:

A) catalyst component consisting essentially of
  i) about 1.5 weight % to about 6 weight % titanium,
  ii) about 10 weight % to about 20 weight % magnesium,
  iii) about 40 weight % to about 70 weight % halogen, preferably Cl, Br, I, or combinations thereof,
  iv) about 5 weight % to about 25 weight % polycarboxylic ester selected from the group consisting of esters aliphatic, aromatic, alicyclic polycarboxylic acids, preferably alkyl phthalates, and
  v) about 0.1 weight percent to about 2.5 weight % organic phosphorous compound selected from the group consisting of hydrocarbon esters of phosphoric acid such that each hydrocarbon group has one to about six carbon atoms;
B) electron donor described by the formula:

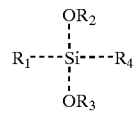

wherein $R_1$ is alkyl or cycloakyl group containing at least one secondary or tertiary carbon atom, $R_2$ and $R_3$ are each independently alkyl or aryl group, and $R_4$ is an alkyl group having a primary carbon bonded to the silicon atom; and
C) organic aluminum compound.

Another embodiment providing differing results is process of co-polymerizing monomer having at least one Ziegler-Natta polymerizable bond, comprising contacting co-monomer with, reacting co-monomer in presence of, or combinations thereof, catalyst system comprising:

A) catalyst component consisting essentially of
  i) about 1.5 weight % to about 6 weight % titanium,
  ii) about 10 weight % to about 20 weight % magnesium,
  iii) about 40 weight % to about 70 weight % halogen,
  iv) about 5 weight % to about 25 weight % polycarboxylic ester selected from the group consisting of esters aliphatic, aromatic, alicyclic polycarboxylic acids, preferably alkyl phthalates or combinations thereof, and
  v) about 0.1 weight percent to about 2.5 weight % organic phosphorous compound selected from the group consisting of hydrocarbon esters of phosphoric acid such that each hydrocarbon group has one to about six carbon atoms;
B) electron donor described by the formula:

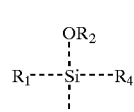

wherein $R_1$ is alkyl or cycloakyl group containing at least one secondary or tertiary carbon atom, $R_2$ and $R_3$ are each independently alkyl or aryl group, and $R_4$ is an alkyl group having a primary carbon bonded to the silicon atom; and
C) organic aluminum compound.

Useful variants of each of these embodiments may be obtained by preparing the catalyst system of each by a process comprising the steps of:

A) Preparing the catalyst component by:

i) dissolving in a solvent mixture, a magnesium halide compound selected from the group consisting of magnesium halide complexes of magnesium halide with water or alcohol and derivatives of magnesium halide wherein a halogen atom is replaced by a hydrocarboxyl group or a halohydrocarboxyl group; the solvent mixture consisting of an organic epoxy compound, selected from the group consisting of oxides of aliphatic olefins and diolefins, oxides of halogenated aliphatic olefins and diolefins and glycidyl ethers, all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;

ii) mixing the homogeneous solution with a liquid titanium compound having the formula $TiX_n(OR)_{4-n}$ wherein X is halogen, R is an alkyl group being identical or different and n is an integer of 0 to 4;

c) adding at least one auxiliary precipitant selected from the group consisting of carboxylic acid anhydrides, carboxylic acids, ethers and ketones to form a precipitate;

d) adding a polycarboxylic acid ester, preferably alkyl phthalate, when a precipitate appears;

e) separating the precipitate from the mixture and treating the separated precipitate with titanium compound, $TiX_n(OR)_{4-n}$ wherein X is halogen, R is a hydrocarbon group and may be identical or different, and n is and integer of from 0 to 4, or a mixture thereof, in an inert diluent; and f) washing the treated precipitate with an organic inert diluent;

B) contacting the catalyst with organoaluminum compound; and

C) contacting catalyst with electron donor, preferably cyclohexylmethyldimethoxysilane, simultaneously with or after step (B).

To gain a better understanding of the significance of this invention, it may be useful to understand the two different types of electron donors used in conventional Ziegler-Natta catalysis and their very different functions in the catalyst systems. Electron donors are typically used in two ways in the formation of a Ziegler-Natta catalyst and a catalyst system.

First, an internal electron donor may be used in the formation reaction of the catalyst component as the transition metal halide is reacted with the metal hydride or metal alkyl. Examples of internal electron donors include: amines, amides, ethers, esters, aromatic esters, ketones, nitriles, phosphines, stilbines, arsines, phosphoramides, thioethers, thioesters, aldehydes, alcoholates, and salts of organic acids. The second use for an electron donor in a catalyst system is as an external electron donor or stereoselectivity agent with an activated catalyst and stereoregulator in the polymerization reaction. The same compound may be used in both instances, although typically they are different. A common external electron donor is an organic silicon compound, for example, cyclohexylmethyldimethoxy silane (CMDS). A description of the two types of electron donors is provided in U.S. Pat. No. 4,535,068, the disclosure of which is hereby incorporated by reference.

The internal electron-donor compounds suitable for preparing conventional Ziegler-Natta catalyst components include ethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. These esters of phthalic acid are the preferred donors.

Catalyst component for this invention may be made according to known methods, including those disclosed in U.S. Pat. Nos. 4,784,983 and 4,861,847 whose methods and materials are incorporated here. For catalyst system embodiment, progressively preferred carboxylic acid ester of catalyst component include those selected from esters of aromatic polycarboxylic acids, particularly dibutyl phthalate and di-isobutyl phthalate. Progressively preferred substitutions for $R_1$ of electron donor is alicyclic group having between about four and about twenty carbon atoms, those radicals having between about six and about twelve carbon atoms, and cyclohexyl group or radical.

Progressively preferred aluminum compounds include the organo alkyl aluminums; trialkyl aluminum; triethyl aluminum, tributyl aluminum, and trimethyl aluminum. Combinations of these are also useful.

For embodiments of polymerization process, the catalyst and electron donor variations as previously delineated provide bases for beneficially functional processes. Further preferred variants include chain transfer agent, preferably $H_2$, introduction into polymerization systems. While this invention is useful with all types of polymerization systems, it is preferred that the chain transfer agent, hydrogen in most instances, should be less than about the solubility limit of the hydrogen in liquid systems. Practically, introduction of hydrogen beyond this limit in liquid or multi-phase systems will contribute nothing, or likely cause process problems, since the excess cannot solvate and will be ineffective as a chain-transfer agent. In loop configured bulk-phase processes, reaching that excess may create one or more bubbles, sometimes known as "gas capping", in the process. Usefully, aluminum:silicon ratios will be within the range of about 2 through about 200 and aluminum:titanium ratios will be within the range of about 2 through about 1000 with the preferred range being about 100 through about 500.

For homopolymerization of ethylene and other monomers from which polymers of differentiated tacticity may be produced, the previously described variants for catalyst component, electron donor, and organic aluminum compound provide process benefits. This process also provides means to produce poly propylene with xylene solubilities in the progressively preferred ranges of less than about 5% and less than about 2 ½%. Use of chain transfer agents, including hydrogen, provide means to produce ethylene polymers of low molecular weight as well as other polymers, particularly polypropylene, having low molecular weight polymer chains.

For copolymerization of monomer, the previously described variants for catalyst component, electron donor, and organic aluminum compound provide useful process benefits. Use of chain transfer agents, including hydrogen, provide means to produce polymers of lower molecular weight.

Our invention may be applied to obtain both better chain transfer agent response, or use of less hydrogen to reach the same molecular weight as indicated by melt index or melt flow rate. Additionally, application of our invention allows the production of higher MFR polymers (lower molecular weight) within processes which are being operated in a range which provides the lowest possible molecular weight polymer while using previously known catalyst systems. As may be seen in FIG. 1, less electron donor is needed, with this catalyst component and electron donor combination to be effective in producing similar polymers to those produced with known systems.

While our experiments were run in laboratory-scale batch reactors, use of our invention is transferrable among the various production processes including bulk process, liquid phase, gas phase, commercial high-pressure, other polymerization systems useful for polymerizing monomers having at least one Ziegler-Natta polymerizable bond, and combinations thereof.

To illuminate various facets of this invention, we provide various examples here. These examples are not intended to describe the entire scope of our invention and we do not believe they accomplish that. Upon review by those skilled in the area of art in which this invention fits, other specific embodiments which are not illustrated here will become apparent. We do not intend to exclude those embodiments and indeed consider them as part of our invention.

EXAMPLES

Several polymerization trials were run with catalyst system of this invention as well as comparative examples. Results are summarized in Tables 1 and 2. Catalyst component used in these experimental runs is available from Catalyst Resources, Inc. in Bayport, Texas USA under the tradename "Lynx 1000". This component was stated as having been produced with materials and under processes disclosed in U.S. Pat. Nos. 4,861,847 and 4,784,983.

The catalyst used in the Comparative Examples is commercially available, was believed to be prepared with the materials and processes as disclosed in U.S. Pat. Nos. 4,927,797; 4,816,433 and 4,839,321, and is sold by Toho Titanium, Inc. under the tradename "ITHC-32A".

Example 1

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.45 L of propylene were added. The reactor was stirred at 1300 rpm. 1.0 mmole of TEAl and 0.5 mmole of cyclohexylmethyldimethoxysilane (CMDS) were added to a 40 cc tubular reaction vessel. The TEAl and donor were allowed to pre-contact approximately one minute. Ten milligrams of catalyst, Lynx 1000, in a mineral oil suspension were added to the 40 cc reaction cylinder. The catalyst was allowed to pre-contact the TEAl and donor mixture for approximately two minutes. The tubular reaction vessel was then attached to an entry point on the reactor and the contents of the vessel were then flushed into the reactor with 1.45 L of room temperature propylene. The total amount of liquid propylene present in the reactor was about 2.9 L. The reactor temperature was then raised to 70° C. The polymerization reaction was allowed to proceed for one hour, at which point it is terminated by venting the excess propylene and cooling the reactor to room temperature. The reactor was then opened to collect the polymer product which was dried, weighed and analyzed. The Al/Ti mole ratio was calculated from the molar amount of cocatalyst used divided by the molar amount of catalyst. The Al/Si mole ratio was calculated from the molar amount of electron donor used divided by the molar amount of catalyst. The Si/Ti mole ratio was calculated from the molar amount of cocatalyst used divided by the molar amount of electron donor. The xylene solubles were measured by dissolving the polymer in hot xylene, cooling the solution to 0° C. and precipitating out the isotactic form. The xylene solubles are the weight % of the polymer that was soluble in the cold xylene. The results are shown in Table 1.

SUMMARY OF POLYMERIZATION CONDITIONS wt. of catalyst: 10.0 mgrams
amount of TEAL (co-catalyst): 1.0 mmoles
amount of CMDS (electron donor): 0.1 mmoles
Al/Ti: 200
Al/Si: 10
Si/Ti: 20
Hydrogen: 16 mmoles
Propylene: 2.9 L (1500 g)
Temp.: 70° C.
Time: 1 hr.

Example 2

The procedures of Example 1 were repeated as indicated in Table 1. The results are tabulated in Table 1.

Example 3

The procedures of Example 1 were repeated except that the amount of electron donor was decreased to 0.1 mmole as indicated in Table 1. The results are tabulated in Table 1.

Example 4

The procedures of Example 1 were repeated except that the amount of electron donor was decreased to 0.05 mmole as indicated in Table 1. The results are tabulated in Table 1.

Example 5

The procedures of Example 4 were repeated as indicated in Table 1. The results are tabulated in Table 1.

Example 6

The procedures of Example 1 were repeated except that the amount of electron donor was decreased to 0.03 mmole as indicated in Table 1. The results are tabulated in Table 1.

Example 7

The procedures of Example 1 were repeated except that the amount of electron donor was decreased to 0.02 mmole as indicated in Table 1. The results are tabulated in Table 1.

Example 8

The procedures of Example 1 were repeated except that the amount of electron donor was decreased to 0.01 mmole as indicated in Table 1. The results are tabulated in Table 1.

Example 9

The procedures of Example 8 were repeated as indicated in Table 1. The results are tabulated in Table 1.

Comparative Examples 1–9

The procedures of Examples 1–9 were repeated except that another commercially available Ziegler-Natta catalyst component, from Toho, was substituted for the catalyst component used in Examples 1–9. Comparative results are displayed in Table 2.

TABLE 1

| Example | TEAl mmol | CMDS mmol | Si/Ti | Catalyst mg | Xylene Solubles |
|---|---|---|---|---|---|
| 1 | 1 | 0.5 | 100 | 10 | 1.08 |
| 2 | 1 | 0.5 | 100 | 10 | 1.4 |
| 3 | 1 | 0.1 | 20 | 10 | 1.7 |
| 4 | 1 | 0.05 | 10 | 10 | 1.48 |
| 5 | 1 | 0.05 | 10 | 10 | 2.0 |
| 6 | 1 | 0.03 | 6.67 | 10 | 3.2 |
| 7 | 1 | 0.02 | 4 | 10 | 2.3 |
| 8 | 1 | 0.01 | 2 | 10 | 3.08 |
| 9 | 1 | 0.01 | 2 | 10 | 5.1 |

TABLE 2

(Comparative Examples)

| Comp. Example | TEAl mmol | CMDS mmol | Si/Ti | Catalyst mg | Xylene Solubles |
|---|---|---|---|---|---|
| 1 | 1 | 0.5 | 100 | 10 | 1.12 |
| 2 | 1 | 0.5 | 100 | 10 | 1.5 |
| 3 | 1 | 0.1 | 20 | 10 | 1.4 |
| 4 | 1 | 0.05 | 10 | 10 | 1.72 |
| 5 | 1 | 0.05 | 10 | 10 | 2.8 |
| 6 | 1 | 0.03 | 6.67 | 10 | 7.1 |
| 7 | 1 | 0.02 | 4 | 10 | 8.7 |
| 8 | 1 | 0.01 | 2 | 10 | 10.54 |
| 9 | 1 | 0.01 | 2 | 10 | 6.8 |

For these examples, the percentage of xylene solubles of polypropylene is controlled by the amount of electron donor present. Generally, the xylene solubles level decreases with increasing amount of electron donor. The process using the combination of the particular electron donor and the specific catalyst component demonstrates improved control of xylene solubles, i.e., lower xylene solubles at a given amount or concentration of electron donor. As the data above demonstrate, certain catalyst components produce relatively lower xylene solubles at a given level of electron donor. As shown in the Examples, Comparative Examples and Tables 1 and 2 above, xylene solubles are generally significantly lower for the combination of a particular electron donor with the specific catalyst component of Examples 1–9 and Table 1 when compared with the same electron donor of Comparative Examples 1–9 and Table 2. It is clear from these tables that lower donor levels are needed to obtain the same results, with this catalyst, as are provided with the THC catalyst as graphically demonstrated in FIG. 1. Such improvements are economically important. Use of less donor provides process and materials savings for the polymer producer and, ultimately, the consumer.

While the inventive catalyst system may be used in commercially known polymerization process, a preferred process for the process invention includes pre-polymerization of the catalyst by contacting a small amount of monomer with the catalyst after the catalyst has been contacted with the aluminum compound and electron donor. Useful pre-polymerization processes are described in U.S. Pat. Nos. 4,767,735; 4,927,797; and 5,432,139 whose methods and materials are incorporated here. As provided in these disclosures, a carrier stream for the catalyst is provided, the catalyst is contacted with the co-catalyst or organoaluminum compound, the catalyst is contacted with the electron donor, the catalyst stream is contacted with a comparatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. Polymer product may then be withdrawn from the reactor.

In commercial process using Ziegler-Natta catalyst, chain transfer agents, notably hydrogen may be used in control of molecular weight. The catalyst component, co-catalyst, electron donor, and reactor conditions all affect molecular weight; however, the amount of chain transfer agent, in most cases hydrogen, may be varied to obtain a target molecular weight within selected materials and conditions. One measure of molecular weight is the melt flow rate for polypropylene, or melt index for polyethylene.

The following Examples and Comparative Examples illustrate beneficial aspects of improved function and response of chain transfer agent, especially hydrogen, in detail. Results are summarized in Tables 3 and 4. The catalyst component used in the Examples was "Lynx 1000" as previously described.

Catalyst used in the Comparative Examples, as described earlier was purchased and is available from Toho Titanium, Inc. under the tradename "THC-32A".

Example 10

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 16 mmoles of hydrogen and 1.45 L of propylene were added. The reactor was stirred at 1300 rpm. 1.0 mmole of TEAl and 0.1 mmole of cyclohexylmethyldimethoxysilane (CMDS) were added to a 40 cc tubular reaction vessel. The TEAl and donor were allowed to pre-contact approximately one minute. Ten milligrams of catalyst in a mineral oil suspension were added to the 40 cc reaction cylinder. The catalyst was allowed to pre-contact the TEAl and donor mixture for approximately two minutes. The tubular reaction vessel was then attached to an entry point on the reactor and filled with room temperature liquid propylene which was allowed to polymerize for about five seconds to effect prepolymerization of the catalyst. The contents of the vessel were then flushed into the reactor with 1.45 L of room temperature propylene. The total amount of liquid propylene present in the reactor was about 2.9 L. The reactor temperature was then raised to 70° C. The polymerization reaction was allowed to proceed for one hour, at which point it is terminated by venting the excess propylene and cooling the reactor to room temperature.

The reactor was then opened to collect the polymer product which was dried, weighed and analyzed. The Al/Ti mole ratio was calculated from the molar amount of cocatalyst used divided by the molar amount of catalyst. The Al/Si mole ratio was calculated from the molar amount of cocatalyst used divided by the molar amount of electron donor. The melt flow index was determined by the weight in grams of polymer melt extruded in 10 minutes at 230° C. using equipment and techniques conforming to ASTM "Standard Test Method for Melt Flow Rates of Thermoplastics by Extrusion Plastometer" Method D1238- 90b. The results are shown in Table 1.

SUMMARY OF POLYMERIZATION CONDITIONS wt. of catalyst: 10.0 mgrams amount of TEAL (co-catalyst): 1.0 mmoles amount of CMDS (electron donor): 0.1 mmoles
Al/Ti: 200
Al/Si: 10
Si/Ti: 20
Hydrogen: 16 mmoles
Propylene: 2.9 L (1500 g)
Temp.: 70° C.
Time: 1 hr.

Example 11

The procedures of Example 10 were repeated except that the amount of hydrogen was increased to 32 mmoles as indicated in Table 3. The results are tabulated in Table 3.

Example 12

The procedures of Example 10 were repeated as indicated in Table 3. The results are tabulated in Table 3.

Example 13

The procedures of Example 10 were repeated except that the amount of hydrogen was increased to 32 mmoles and the Si/Ti ratio was decreased to 4 as indicated in Table 3. The results are tabulated in Table 3.

Comparative Examples 10–13

The procedures of Examples 10 - 13 were repeated except that another commercially available Ziegler-Natta catalyst component was substituted for the catalyst component used in Examples 10–13 The results are shown in Table 4.

TABLE 3

| Example | TEAl mmol | CMDS mmol | Si/Ti | Catalyst mg | mmol $H_2$ | Melt Flow |
|---------|-----------|-----------|-------|-------------|-----------|-----------|
| 10 | 1 | 0.1 | 20 | 10 | 16 | 4.96 |
| 11 | 1 | 0.1 | 20 | 10 | 32 | 9.02 |
| 12 | 1 | 0.1 | 20 | 10 | 32 | 8.36 |
| 13 | 1 | 0.1 | 4 | 10 | 32 | 14.29 |

TABLE 4

(Comparative Examples)

| Example | TEAl mmol | CMDS mmol | Si/Ti | Catalyst mg | mmol $H_2$ | Melt Flow |
|---------|-----------|-----------|-------|-------------|-----------|-----------|
| 10 | 1 | 0.1 | 20 | 10 | 16 | 3.01 |
| 11 | 1 | 0.1 | 20 | 10 | 32 | 5.84 |
| 12 | 1 | 0.1 | 20 | 10 | 16 | 3.29 |
| 13 | 1 | 0.1 | 4 | 10 | 32 | 11.33 |

The molecular weight of polypropylene is controlled by the amount of hydrogen and electron donor present and is indicated by melt flow. Generally, the molecular weight decreases with increasing amount of hydrogen, or the Melt Flow increases. The process using the combination of the particular electron donor and the specific catalyst component demonstrates an improved hydrogen response, i.e., higher melt flow for the same amount of hydrogen at a given level or concentration of donor. As the data above demonstrates, certain catalyst components produces relatively higher molecular weight at the same level of hydrogen. As shown in the Examples, Comparative Examples and Tables 3 and 4 above, molecular weight is generally significantly higher for the combination of a particular electron donor with the specific catalyst component of Examples 10–13 and Table 3 when compared with the same electron donor of Comparative Examples 10–13 and Table 4.

Examples 14 and 15

Comparison of the inventive catalyst/electron donor system (as Example 14) with the known Toho catalyst also using CMDS as the electron donor (Example 15 (comparative)) was made for copolymerization of ethylene with propylene. This experimental run was performed in a loop bulk-phase reactor. The target was to attain similar ethylene incorporation and similar average molecular weight while using similar conditions to the greatest extent possible. Results of this experimental comparison are presented in Table 4.

TABLE 4

| Ex. | Temp. (° C.) | $H_2$ (mol %) | Al/Si Ratio | Melt Flow (dg/min) | $C_2^=$ (wt. %) |
|-----|--------------|---------------|-------------|---------------------|-----------------|
| 14 | 63 | 0.45–0.55 | 7.2–5.4 | 30 | 3 |
| 15 | 63 | 0.83 | 3.9–3.3 | 30 | 3 |

By way of explanation, the symbol, $C_2^{32}$, represents ethylene; its column in Table 4 provides ethylene weight % in the final copolymer. It should be noted that the concentration of hydrogen gas in the system for the comparative example (Example 15) is 0.83 mole % which is the effective process limitation in that attempts to increase the concentration of hydrogen beyond this will result in the $H_2$ leaving the solution and forming a gas bubble, an intolerable condition in a loop configuration bulk-phase reactor. This also means that the MFR of 30 for that example is the highest possible under those system conditions since the concentration of the chosen chain-transfer agent (hydrogen for these examples) cannot be sufficient to make shorter polymer chains.

In light of this, the comparison of the inventive against the known catalyst demonstrates one of the more remarkable facets of this invention: use of less chain-transfer agent (in this case hydrogen) with the inventive catalyst system to obtain the same results as can only be obtained with greater hydrogen concentrations with the known catalyst systems. Clearly, even shorter copolymer chains could be obtained with use of still greater concentrations of hydrogen; a goal which simply would not be obtainable with the comparative catalyst system.

As mentioned, the previous examples are provided for illumination, not definition of scope. The description of our invention is provided in the following claims.

We claim:

1. Process of polymerizing monomer having at least one Ziegler-Natta polymerizable bond, comprising contacting monomer with, reacting monomer in presence of, or combinations thereof, catalyst system comprising:

A) catalyst component consisting essentially of
  i) about 1.5 weight % to about 6 weight % titanium,
  ii) about 10 weight % to about 20 weight % magnesium,
  iii) about 40 weight % to about 70 weight % halogen,
  iv) about 5 weight % to about 25 weight % polycarboxylic ester selected from the group consisting of esters of aliphatic, aromatic, or alicyclic polycarboxylic acids, and
  v) about 0.1 weight percent to about 2.5 weight % organic phosphorous compound selected from the group consisting of hydrocarbon esters of phosphoric acid such that each hydrocarbon group has one to about six carbon atoms;

B) electron donor described by the formula:

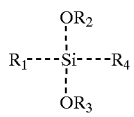

wherein $R_1$ is cycloakyl group containing about 6 to about 12 carbon atoms and having at least one secondary or tertiary carbon atom, $R_2$ and $R_3$ are each independently alkyl or aryl group, and $R_4$ is an alkyl group having a primary carbon bonded to the silicon atom; and C) organic aluminum compound.

2. Process of homo-polymerizing ethylene or other monomers having at least one Ziegler-Natta polymerizable bond, other monomers being capable of producing polymer of differentiated tacticity, comprising contacting monomers with, reacting monomers in presence of, or combinations thereof, catalyst system comprising:

A) catalyst component consisting essentially of
   i) about 1.5 weight % to about 6 weight % titanium,
   ii) about 10 weight % to about 20 weight % magnesium,
   iii) about 40 weight % to about 70 weight % halogen,
   iv) about 5 weight % to about 25 weight % polycarboxylic ester selected from the group consisting of esters of aliphatic, aromatic, or alicyclic polycarboxylic acids, or combinations thereof, and
   v) about 0.1 weight percent to about 2.5 weight % organic phosphorous compound selected from the group consisting of hydrocarbon esters of phosphoric acid such that each hydrocarbon group has one to about six carbon atoms;

B) electron donor described by the formula:

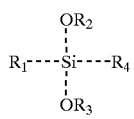

wherein $R_1$ is cycloakyl group containing about 6 to about 12 carbon atoms and having at least one secondary or tertiary carbon atom, $R_2$ and $R_3$ are each independently alkyl or aryl group, and $R_4$ is an alkyl group having a primary carbon bonded to the silicon atom; and C) organic aluminum compound.

3. Process of co-polymerizing monomers having at least one Ziegler-Natta polymerizable bond, comprising contacting monomers with, reacting monomers in presence of, or combinations thereof, catalyst system comprising:

A) catalyst component consisting essentially of
   i) about 1.5 weight % to about 6 weight % titanium,
   ii) about 10 weight % to about 20 weight % magnesium,
   iii) about 40 weight % to about 70 weight % halogen,
   iv) about 5 weight % to about 25 weight % polycarboxylic ester selected from the group consisting of esters of aliphatic, aromatic, or alicyclic polycarboxylic acids, or combinations thereof or alkyl phthalates, and V) about 0.1 weight percent to about 2.5 weight % organic phosphorous compound selected from the group consisting of hydrocarbon esters of phosphoric acid such that each hydrocarbon group has one to about six carbon atoms;

B) electron donor described by the formula:

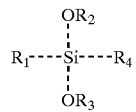

wherein $R_1$ is cycloakyl group containing about 6 to about 12 carbon atoms and having at least one secondary or tertiary carbon atom, $R_2$ and $R_3$ are each independently alkyl or aryl group, and $R_4$ is an alkyl group having a primary carbon bonded to the silicon atom; and C) organic aluminum compound.

4. Process of claim 1 wherein catalyst is prepared by process comprising the steps of:

A) Preparing the catalyst component by:
   i) dissolving in a solvent mixture, a magnesium halide compound selected from the group consisting of magnesium halide complexes of magnesium halide with water or alcohol and derivatives of magnesium halide wherein a halogen atom is replaced by a hydrocarboxyl group or a halohydrocarboxyl group; the solvent mixture consisting of an organic epoxy compound, selected from the group consisting of oxides of aliphatic olefins and diolefins, oxides of halogenated aliphatic olefins and diolefins and glycidyl ethers, all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;
   ii) mixing the homogeneous solution with a liquid titanium compound having the formula $TiX_n(OR)_{4-n}$ wherein X is halogen, R is an alkyl group being identical or different and n is an integer of 0 to 4;
   iii) adding at least one auxiliary precipitant selected from the group consisting of carboxylic acid anhydrides, carboxylic acids, ethers and ketones to form a precipitate;
   iv) adding a polycarboxylic acid ester when a precipitate appears;
   v) separating the precipitate from the mixture and treating the separated precipitate with titanium compound, $TiX_n(OR)_{4-n}$ wherein X is halogen, R is a hydrocarbon group and may be identical or different, and n is an integer of from 0 to 4, or a mixture thereof, in an inert diluent; and
   vi) washing the treated precipitate with an organic inert diluent;

B) contacting the catalyst with organoaluminum compound; and c) contacting catalyst with electron donor of claim 1. B) simultaneously with or after step (B).

5. Process of claim 4 wherein polycarboxylic ester of catalyst component is selected from esters of aromatic polycarboxylic acids.

6. Process of claim 5 wherein polycarboxylic ester of catalyst component is selected from dibutyl phthalate, di-isobutylphthalate, or combinations thereof.

7. Process of claim 6 wherein electron donor is cyclohexylmethyldimethoxysilane.

8. Process of claim 2 wherein catalyst system is prepared by process comprising the steps of:
A) Preparing the catalyst component by:
  i) dissolving in a solvent mixture, a magnesium halide compound selected from the group consisting of magnesium halide complexes of magnesium halide with water or alcohol and derivatives of magnesium halide wherein a halogen atom is replaced by a hydrocarboxyl group or a halohydrocarboxyl group; the solvent mixture consisting of an organic epoxy compound, selected from the group consisting of oxides of aliphatic olefins and diolefins, oxides of halogenated aliphatic olefins and diolefins and glycidyl ethers, all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;
  ii) mixing the homogeneous solution with a liquid titanium compound having the formula $TiX_n(OR)_{4-n}$ wherein X is halogen, R is an alkyl group being identical or different and n is an integer of 0 to 4;
  iii) adding at least one auxiliary precipitant selected from the group consisting of carboxylic acid anhydrides, carboxylic acids, ethers and ketones to form a precipitate;
  iv) adding a polycarboxylic acid ester when a precipitate appears;
  v) separating the precipitate from the mixture and treating the separated precipitate with titanium compound, $TiX_n(OR)_{4-n}$ wherein X is halogen, R is a hydrocarbon group an may be identical or different, and n is an integer of from 0 to 4, or a mixture thereof, in an inert diluent; and
  vi) washing the treated precipitate with an organic inert diluent;
B) contacting the catalyst with organoaluminum compound; and
C) contacting catalyst with electron donor of claim 2. B) simultaneously with or after step (B).

9. Process of claim 8 wherein polycarboxylic ester of catalyst component is selected from esters of aromatic polycarboxylic acids.

10. Process of claim 9 wherein polycarboxylic ester of catalyst component is selected from dibutyl phthalate, di-isobutylphthalate, or combinations thereof.

11. Process of claim 10 wherein electron donor is cyclohexylmethyldimethoxysilane.

12. Process of claim 3 wherein catalyst system is prepared by process comprising the steps of:
A) Preparing the catalyst component by:
  i) dissolving in a solvent mixture, a magnesium halide compound selected from the group consisting of magnesium halide complexes of magnesium halide with water or alcohol and derivatives of magnesium halide wherein a halogen atom is replaced by a hydrocarboxyl group or a halohydrocarboxyl group; the solvent mixture consisting of an organic epoxy compound, selected from the group consisting of oxides of aliphatic olefins and diolefins, oxides of halogenated aliphatic olefins and diolefins and glycidyl ethers, all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;
  ii) mixing the homogeneous solution with a liquid titanium compound having the formula $TiX_n(OR)_{4-n}$ wherein X is halogen, R is an alkyl group being identical or different and n is an integer of 0 to 4;
  iii) adding at least one auxiliary precipitant selected from the group consisting of carboxylic acid anhydrides, carboxylic acids, ethers and ketones to form a precipitate;
  iv) adding a polycarboxylic acid ester when a precipitate appears;
  v) separating the precipitate from the mixture and treating the separated precipitate with titanium compound, $TiX_n(OR)_{4-n}$ wherein X is halogen, R is a hydrocarbon group an may be identical or different, and n is an integer of from 0 to 4, or a mixture thereof, in an inert diluent; and
  vi) washing the treated precipitate with an organic inert diluent;
B) contacting the catalyst with organoaluminum compound; and
C) contacting catalyst with electron donor of claim 3. B) simultaneously with or after step (B).

13. Process of claim 12 wherein polycarboxylic ester of catalyst component is selected from esters of aromatic polycarboxylic acids.

14. Process of claim 13 wherein polycarboxylic ester of catalyst component is selected from dibutyl phthalate, di-isobutylphthalate, or combinations thereof.

15. Process of claim 14 wherein electron donor is cyclohexylmethyldimethoxysilane.

* * * * *